United States Patent [19]

Drummond

[11] Patent Number: 5,320,651
[45] Date of Patent: Jun. 14, 1994

[54] CROSS-FLOW FILM FILL MEDIA WITH INTERGRAL DRIFT ELIMINATOR

[75] Inventor: Larry E. Drummond, Cape Coral, Fla.

[73] Assignee: Munters Corporation, Fort Myers, Fla.

[21] Appl. No.: 97,834

[22] Filed: Jun. 28, 1993

[51] Int. Cl.⁵ .......................................... B01D 45/08
[52] U.S. Cl. ................................... 55/257.2; 55/440; 261/112.2
[58] Field of Search .............. 261/112.2; 55/257.2, 55/440, 444

[56] References Cited

U.S. PATENT DOCUMENTS

| | | | |
|---|---|---|---|
| 2,479,625 | 8/1949 | Kimmell | 55/440 |
| 3,673,771 | 7/1972 | Dickey | 55/440 |
| 4,333,749 | 6/1982 | Holmberg et al. | 55/440 |
| 4,361,426 | 11/1982 | Carter et al. | 261/112.2 |
| 4,514,202 | 4/1985 | Kinney, Jr., et al. | 55/440 |
| 4,801,410 | 1/1989 | Kinney, Jr. et al. | 261/112.2 |
| 5,143,658 | 9/1992 | Thomas | 261/112.2 |
| 5,269,823 | 12/1993 | Wurz | 55/257.2 |

Primary Examiner—Tim Miles
Attorney, Agent, or Firm—Fitzpatrick, Cella, Harper & Scinto

[57] ABSTRACT

A gas and liquid contact body for use in a gas and liquid contact apparatus in which gas and liquid flow in cross-flow relationship to each other includes a plurality of corrugated sheets having opposed first and second edges which are facially opposed in substantially parallel relationship to one another to define a plurality of intersecting and intercommunicating passages allowing the passage of gas and liquid therethrough. In one embodiment, the first edges of the sheets are located generally in the same plane and define a gas inlet edge of the contact body. Alternate sheets in the body are narrower from their first to their second edges than the remainder of the sheets in the body. The second edges of these alternate sheets define an air outlet portion in the body and spaces between the wider adjacent sheets at said outlet portion. Separate undulating drift eliminator segments are formed in the remainder of the sheets which segments include first and second sections having mirror image corrugations formed therein with said second section being folded over the first section within the spaces defined by the alternate sheets to define a drift eliminator which restricts the discharge of liquid droplets from the air outlet portion of the contact body.

8 Claims, 7 Drawing Sheets

CROSS-FLOW FILM FILL MEDIA WITH INTERGRAL DRIFT ELIMINATOR

BACKGROUND OF THE INVENTION

The present invention relates to gas and liquid contact apparatus, and more in particular to a contact body which includes an internal drift eliminator section.

Gas and liquid contact bodies for use in evaporative coolers, humidifiers, heat exchangers, and the like, have been proposed in the past which utilize cross-flow of gas and liquid in the contact body in order to remove heat from the liquid. Such contact bodies have been proposed which are constructed of cross-corrugated sheets of material such as plastic, cellulose, paper and other kinds of materials, as are disclosed in U.S. Pat. Nos. 3,792,841; 3,395,903; and 3,500,615. Such contact bodies have been generally satisfactory in use and commercially successful.

Typically, such contact bodies are used in an enclosure or casing in which the liquid is distributed over the top of the fill and allowed to flow by force of gravity through the interstices or passages in the contact body with the currents of air which are drawn through the body by a power driven fan assembly or the like. It has been found that there is a tendency for water particles in the contact body to drift or be carried along with the rapidly moving air currents toward the air outlet side of the contact body. As a result, separate drift eliminators are sometimes provided adjacent the air discharge side of the fill assembly in order to eliminate or minimize water loss from the contact apparatus through the air discharge opening thereof. Such mist eliminators have been separate elements positioned downstream of the outlet side of the contact body, as disclosed, for example, in U.S. Pat. No. 3,500,615.

The separate drift eliminators of the prior art require additional space within the contact apparatus in order to accommodate the additional width thereof. They also are not capable of returning the liquid to the contact body where it can be further cooled by continuous passage through the contact body.

In lieu of separate drift eliminators, it has also been proposed to form the film sheets with drift eliminator profiles on one edge thereof so that the matching faces form an integral drift eliminator section in the fill. Such products are difficult to make and require at least two sets of differently shaped sheets, thus increasing the expense of manufacture.

It is an object of the present invention to provide an improved contact body in which a mist or drift eliminator is included within the contact body itself.

Another object of the present invention is to provide an improved gas/liquid contact body of the type described.

A further object of the invention is to provide a gas/-liquid contact apparatus which includes a drift eliminator and which is of the same width as a conventional contact body apparatus.

Yet another object of the present invention is to provide a combination gas contact body with an integrally formed drift eliminator that is relatively simple in construction and inexpensive to manufacture.

In accordance with an aspect of the present invention, a gas and liquid contact body is provided for use in a gas and liquid contact apparatus in which gas and liquid flow in cross-flow relationship to one another. The contact body has opposed edge portions and includes first and second sets of corrugated sheets having corrugations formed therein disposed in a direction transversely of the horizontal plane of the contact body. The sheets of the first set are disposed alternately with the sheets of the second set and the corrugations of the first set cross the corrugations of the second set. The sheets have first and second opposed edges located in the direction of gas flow and the corrugations define passageways in the contact body between the edges of the sheets. The sheets in the first set are narrower, edge to edge, than the sheets of the second set thereby to define a space between each of the second sheets at one edge of the contact body. The sheets of the second set have extended end portions which have undulations formed therein and which are folded over against the adjacent portions of its sheet to be located in each of the spaces. The undulations of those extended end portions are inclined oppositely from the inclination of the corrugations of the first sheets to restrict moisture droplets from leaving the contact body through the edge thereof.

BRIEF DESCRIPTION OF THE DRAWINGS

The above and other objects, features and advantages of the present invention will be apparent from the following detailed description of illustrative embodiments thereof, which is to be read in connection with the accompanying drawings wherein.

DETAILED DESCRIPTION OF THE INVENTION

Figure 1:
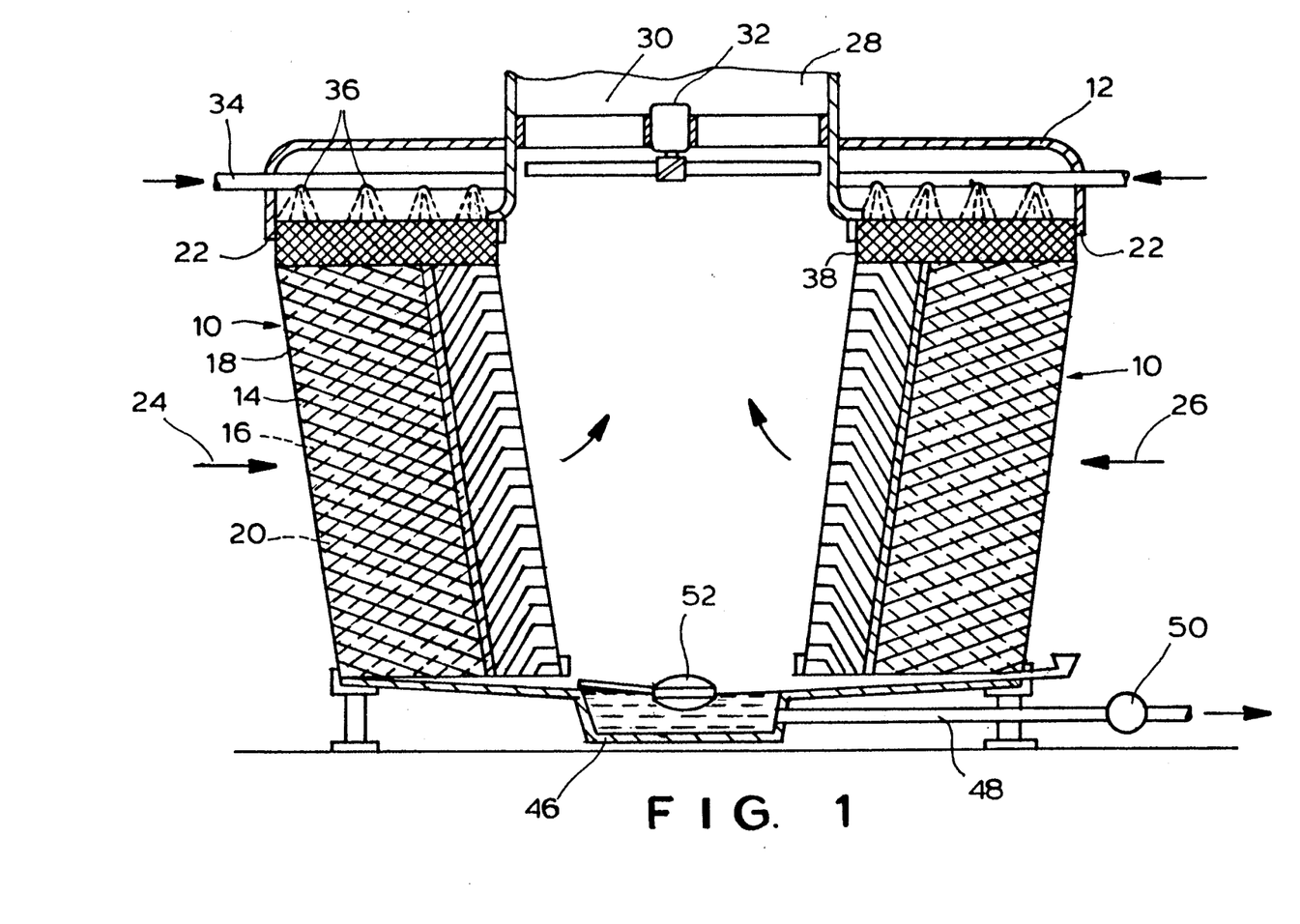
FIG. 1 is a vertical longitudinal section of a gas/liquid contact apparatus including contact bodies constructed in accordance with the present invention.

Referring now to the drawings in detail and initially to FIG. 1 thereof, a gas/liquid contact apparatus, such as, for example, a cooling tower or the like, is illustrated which includes a pair of contact bodies or packings 10 enclosed within a casing or housing 12. The contact bodies are passed by gas and liquid, such as, for example, air and water, in cross relation. The contact bodies or packings 10 are composed of thin sheets of synthetic material, or the like, as described above, which are undulated or corrugated and positioned either vertically or at a slightly inclined angle, as illustrated in FIG. 1.

Figure 3:
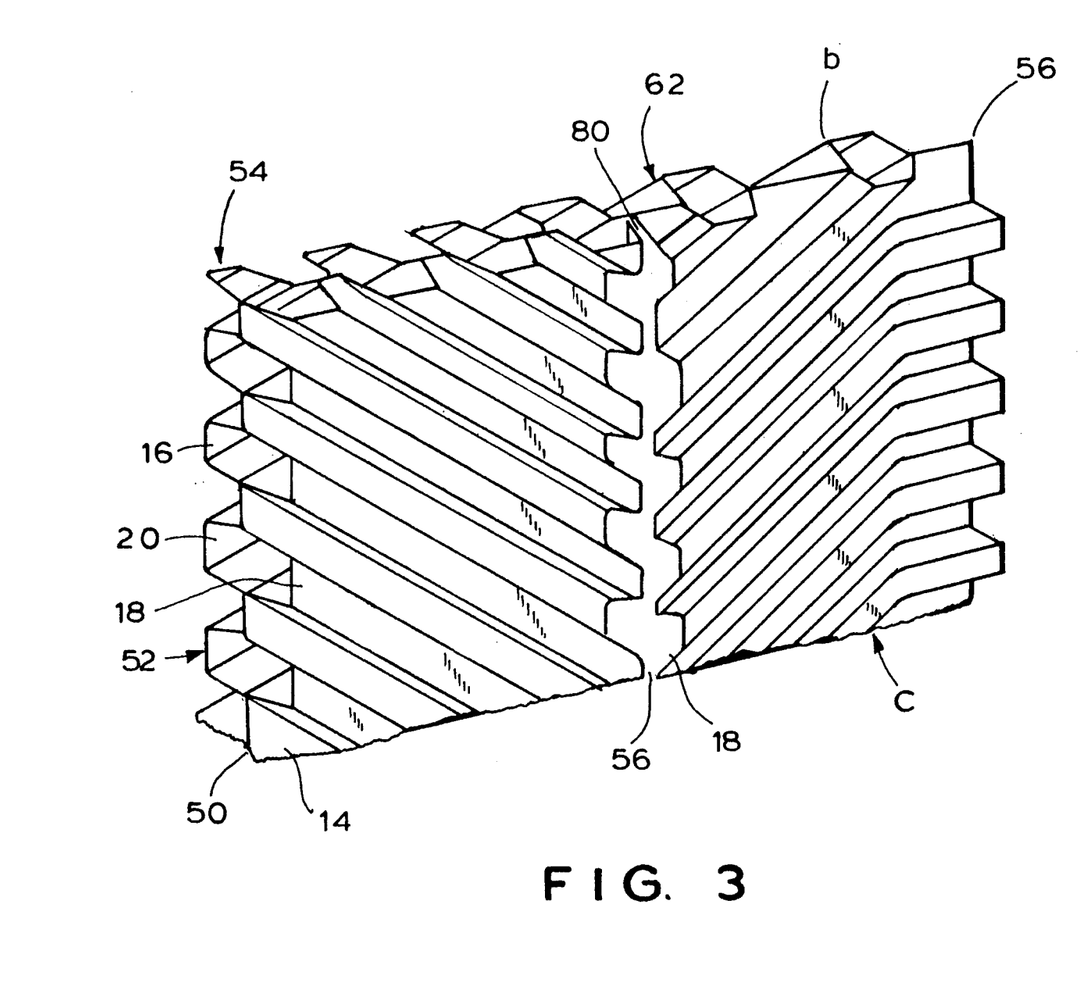
FIG. 3 is a partial perspective view of the liquid/gas contact body of the present invention showing the integral drift eliminator structure.

As seen in FIGS. 1 and 3, each contact body is formed of two sets of sheets 14, 16, having corrugations 18, 20 formed therein which cross one another thereby to form horizontal as well as vertical channels extending through the contact body. These channels will vary in width from zero where the sheets contact one another to a width which is substantially twice the height of the corrugations. The height of the corrugations may range from 5 to 15 mm or more as is known in the art. The corrugations in the sheets can be positioned at equal angles or at unequal angles, as disclosed in U.S. Pat. No. 3,792,841. In either event, the corrugations in one set of sheets (14) incline downwardly in the direction of gas flow and the corrugations in the other set of sheets (16) are inclined upwardly in the direction of gas flow.

Gas is admitted to the contact bodies through the openings 22 in casing 12 and passed through the channels or passageways defined by the corrugated sheets in a horizontal direction generally as indicated by the arrows 24, 26. Casing 12 has an outlet opening 28 formed therein for the gas at its top and a fan 30 is mounted in the opening. The fan is driven by a motor 32, as is well known in the art, in order to draw the gas through the contact bodies.

Water or other liquid is supplied to the contact bodies through the pipes 34 which, along their bottom sides, are provided with outlet openings 36 that are spaced from one another in the longitudinal direction of the pipes. Beneath the openings 36 there are a plurality of vanes or baffles 38 upon which the water jets impinge and are broken up so that the liquid is distributed along the top surface of the contact body. Other means of distributing the liquid through the contact body can also be provided, such as, for example, by the use of perforated pans, or the like, positioned above the top edges of the contact body.

As is well known in the art, the liquid supplied to the top of the contact bodies flows downwardly in the contact body under the influence of gravity where it is met by the cross-flowing gas or air for cleaning the gas, cooling, heating or dehumidification purposes.

The corrugated sheets in the sets 14, 16 have gas inlet edge portions 50, 52, as illustrated in FIG. 3, which are located generally in the same plane in alignment with each other to define an air inlet side of the contact body 54. The sheets 14 have second opposed edges 56 located at the opposite air outlet portion 60 of the contact body. The sheets 14 are narrower in width than sheets 16, between their edges 52, 56 and thereby define a space 62 between each pair of sheets 16 at which the drift eliminator section of the contact body is located.

Figure 2:
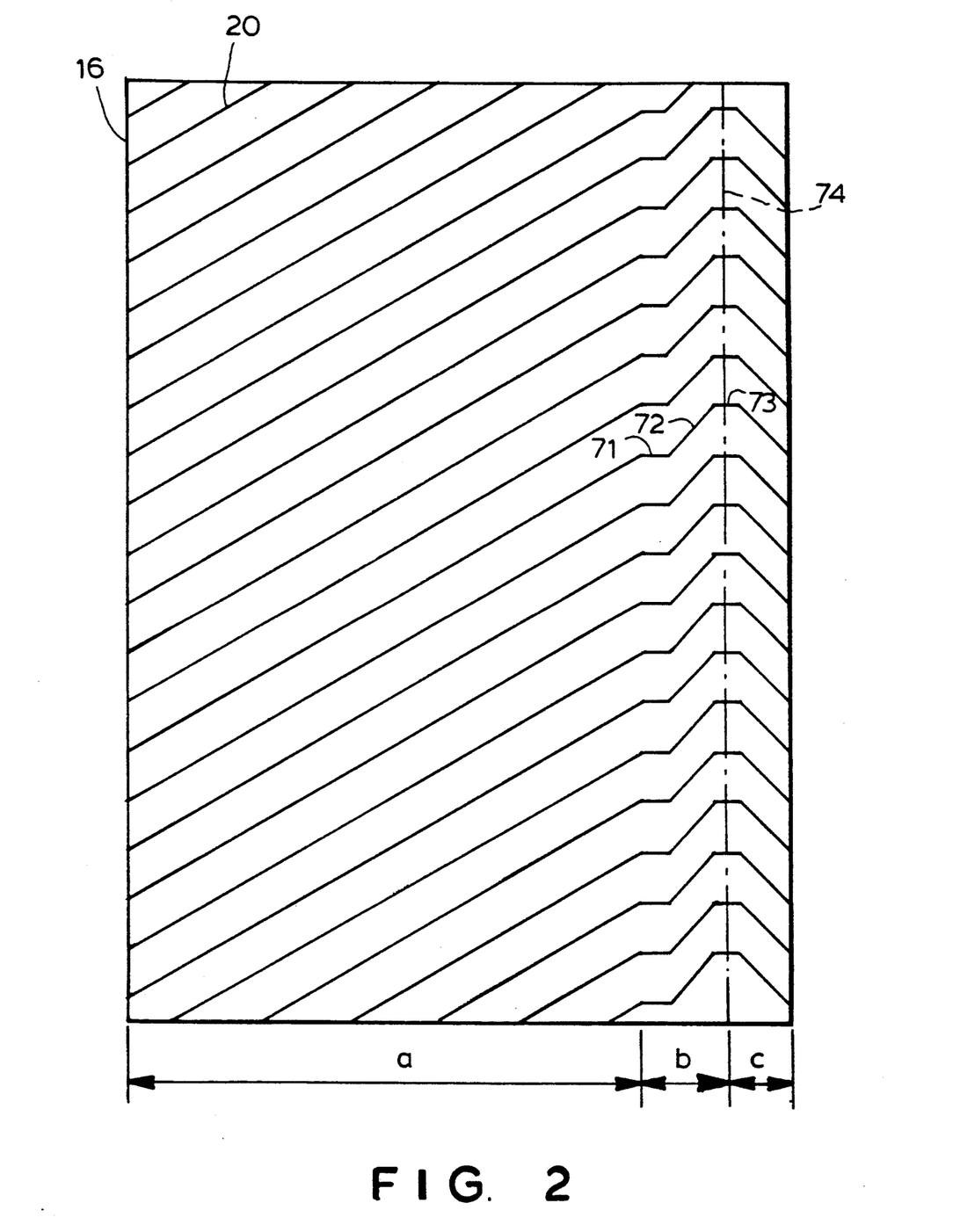
FIG. 2 is an elevational view of a sheet of fill material including an integral drift eliminator section, illustrated in its unfolded position.

In accordance with the present invention, an integral drift eliminator sheet is provided in the contact body as a result of the construction of sheet 16. As seen in FIG. 2 the sheet 16 has straight corrugations 20 formed over the width dimension a (which is the same as the width of sheet 14) and an integral undulating drift eliminator profile configuration over the width dimensions b and c. The dimension b includes a straight corrugation section 71, an upwardly inclined section 72, and a flat section 73. Over the dimension or section c, sheet 16 is formed as the mirror image of section b, without section 71. Although the undulations or corrugations of sections b and c are shown as straight segments, other shapes may be used. Indeed, a variety of such shapes are known in the art. However, it is important that the shape in section c be a mirror image of that in section b.

Figure 4:
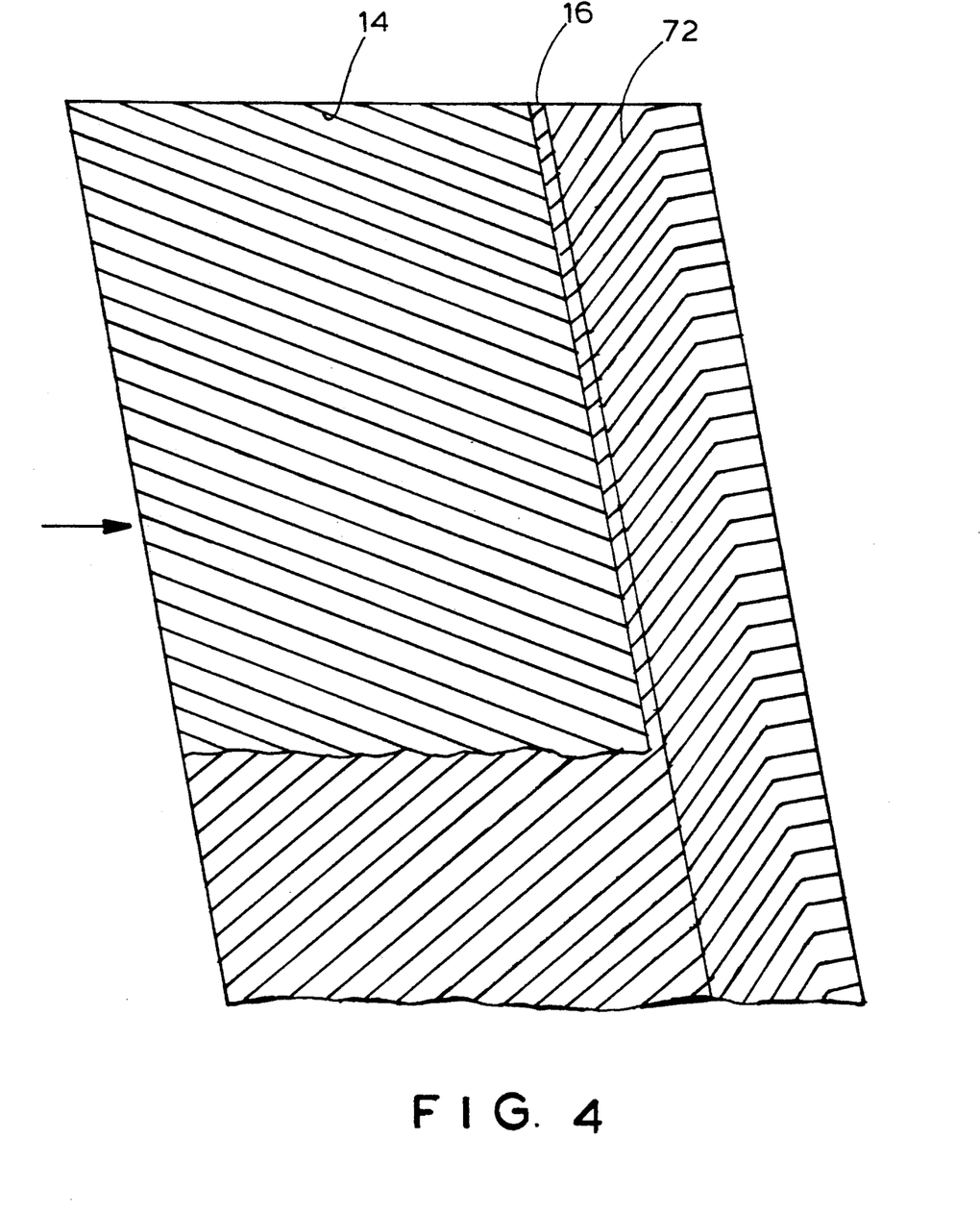
FIG. 4 is a side view of a contact body constructed in accordance with the present invention with parts broken away.

After sheet 16 is formed (e.g. by vacuum molding) it is slit along line 74 which separates the mirror image shapes in section b and c. However the slit does not penetrate the valleys of the corrugations, so section c is not separated from section b. Instead the sections remain connected by the material of the sheets in the valleys of the corrugations which define a fold line at line 74 that permits section c to be folded over section b as seen in FIG. 3. Sheets 16 are then assembled with sheets 14 in alternating relation as seen in FIGS. 3 and 4 with the corrugations of sheets 14 inclined in an opposite direction from the direction of corrugations 18 in the sheets 16. Preferably, the corrugations of sheets 14 are positioned to be inclined downwardly in the direction of gas flow. In this position the folded over section a of sheet 16 is located in the space 62 between adjacent sheets 16 and defines a honeycomb shaped drift eliminator section in the contact body wherein the corrugations 72 of the drift eliminator are positioned to be inclined upwardly.

By this construction of the present invention, gas droplets which would otherwise be discharged from the gas outlet portion of the contact body will be entrained in the undulations or corrugations of the drift eliminator section of the contact body formed by sections a and c of sheets 16 to be trapped in the contact body. Because of the relative inclinations of the channels in the sheet 16 and the inclined corrugations of sections 72 of the drift eliminator section these liquid droplets will be retained within the contact body.

In the illustrative embodiments of the invention shown in FIGS. 2 and 3, the inner edge portion 78 of the sheet 16 is slightly spaced from the edge portion of the adjacent sheet 14. As a result, a generally vertically extending channel 80 is defined within the contact body so that liquid droplets retained by the drift eliminator will be guided by the corrugations of the sheets 16 to the channel where they can drain downwardly within the channel to the sump 46. The droplets will also tend to be redistributed in contact with the corrugations in the sheets 16 and the sheets 14 for further contact with air in the contact body.

In the conventional manner housing 12 includes a discharge conduit 48 extending from the sump 46. The discharge of liquid from sump 46 is controlled through a valve 50 in conduit 48 and a float control mechanism 52 in the conventional manner, such as, for example, is described in U.S. Pat. No. 3,450,393.

Figures 5, 6:
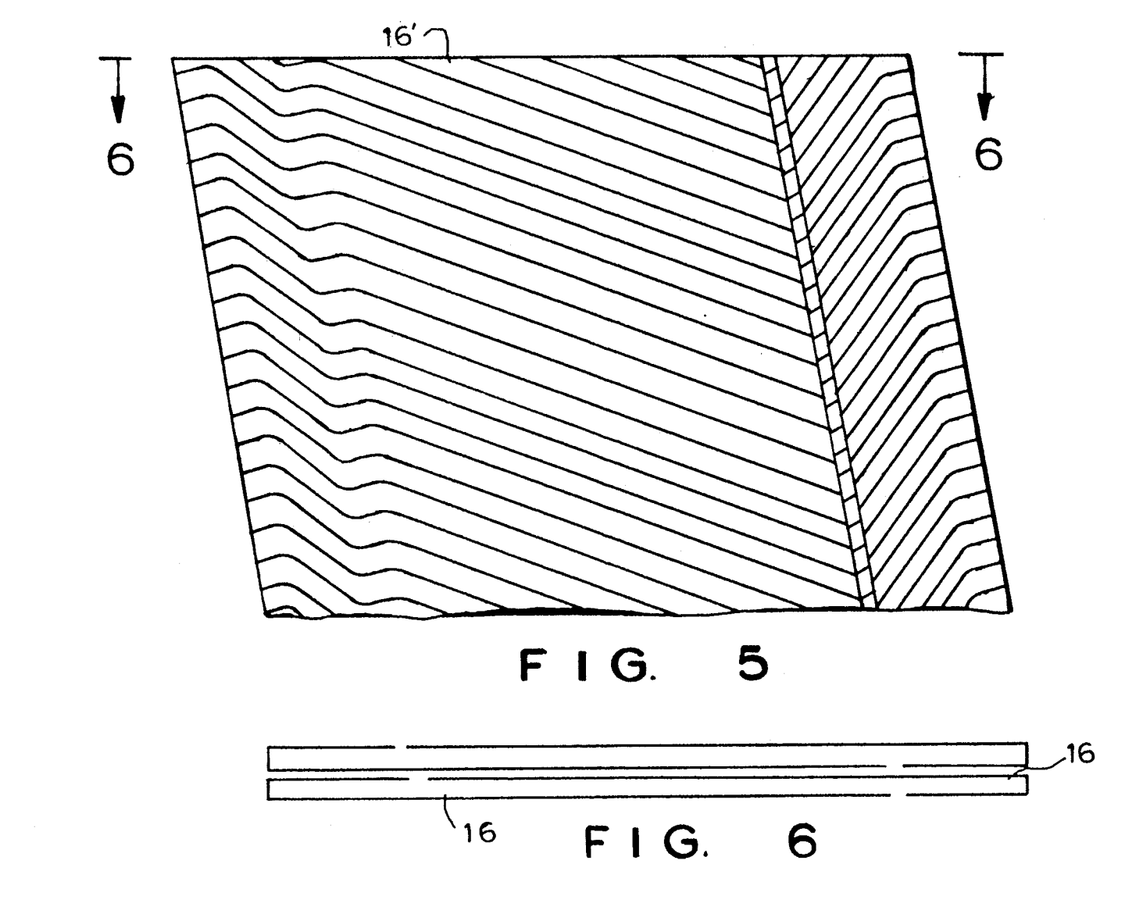
FIG. 5 is a side view of another embodiment of a contact body comprising identical inverted sheets with drift eliminator structure also formed on the air inlet side.
FIG. 6 is a plan view of a portion of the contact body of FIG. 5.

In another embodiment of the invention, illustrated in FIG. 5, a second set of sheets 16', identical to sheets 16, but inverted relative thereto, are used in lieu of sheets 14 to form the contact body. As a result, the drift eliminator honeycomb structure is also formed on the air inlet side of the contact bodies. This structure then serves as a louver section in the fill to stop splash-out of liquid from the fill. Splash-out often occurs when fan 30 is shut off and liquid tends to drain out of the contact body from the air inlet side.

Preferably, the sheets of the contact body including the folded over section a are secured in place to the adjacent sheets by an adhesive or hot welding, or the like, as is conventional for binding full sheets together in prior art devices.

Figure 7:
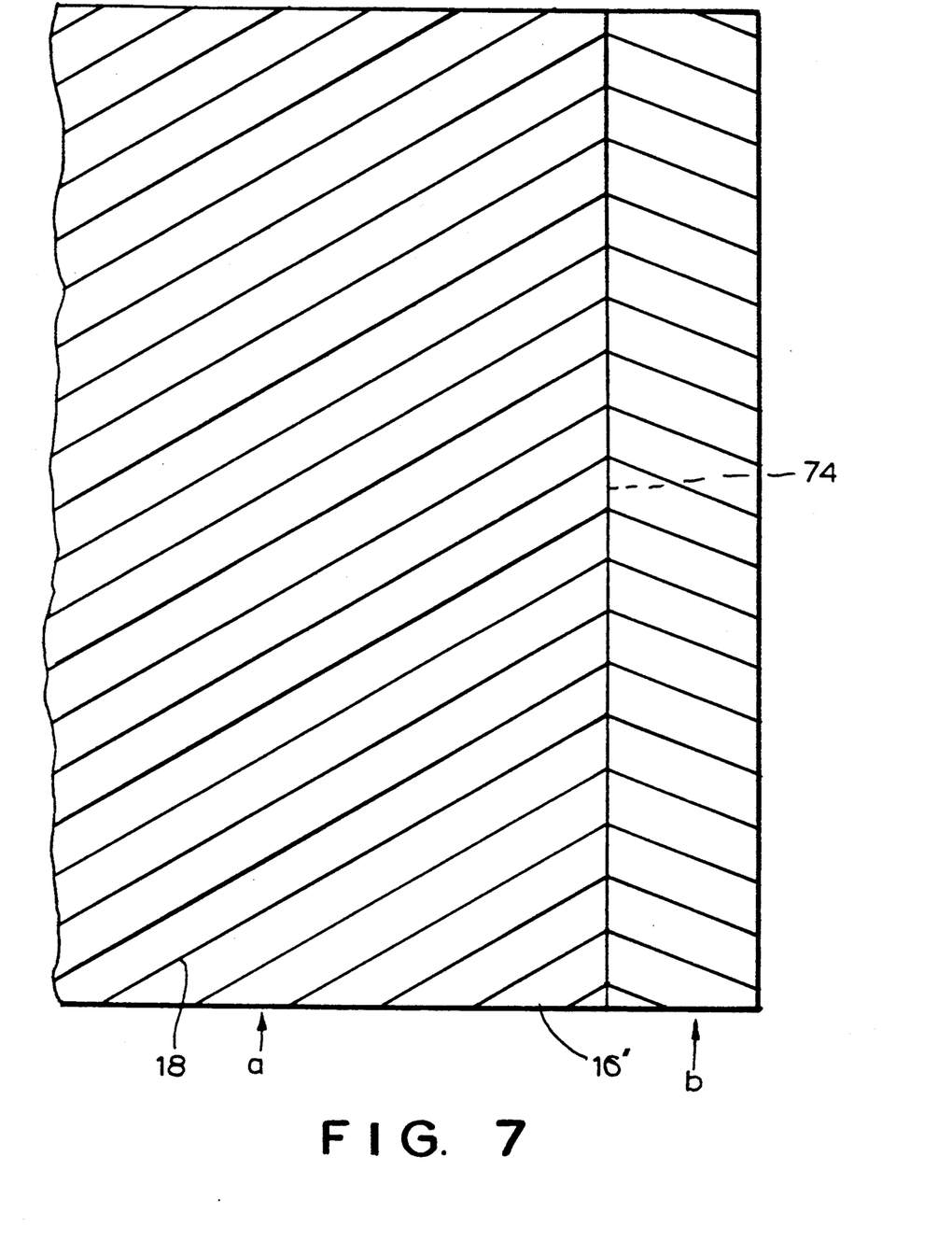
FIG. 7 is an elevational view similar to FIG. 2 of another configuration of a sheet of fill material including an internal drift eliminator section according to the invention.
Figure 8:
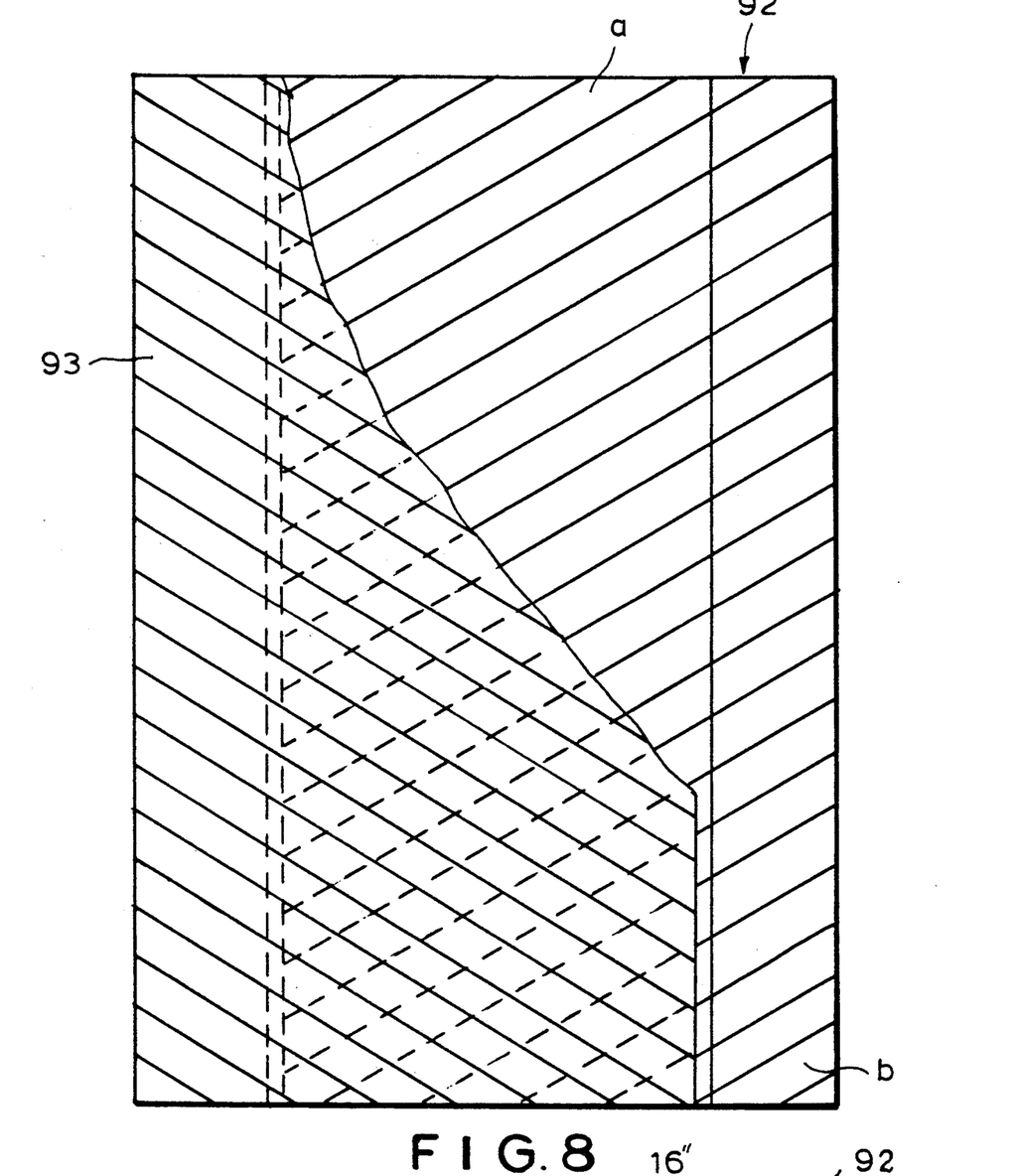
FIG. 8 is an elevational view similar to FIG. 4 of a contact body assembled using the sheets of FIG. 7.
Figure 9:
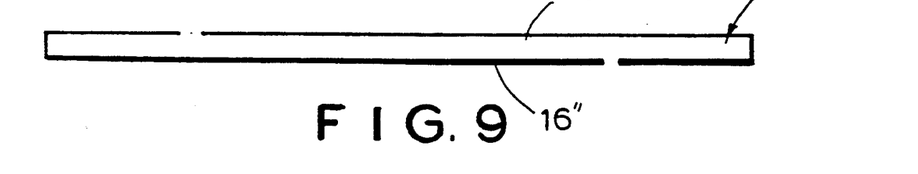
FIG. 9 is top view similar to FIG. 6 of the embodiment of FIG. 8.

Yet another embodiment of the invention is illustrated in FIGS. 7-9. In this case the contact body is formed of two sets of identical sheets 16" having a main section a containing corrugations 18 and a drift eliminator section b corrugated in the opposite direction. The sheets are slit along line 74 as described above and section b is folded over section a to define a drift eliminator honeycomb structure 92. The contact body is formed from a plurality of such sheets with adjacent sheets inverted with respect to each other so that an inlet louver section 93 is also provided.

Although illustrative embodiments of the present invention have been described herein in detail, it is to be understood that the invention is not limited to those precise embodiments and that various changes and modifications may be effected therein by those skilled in the art without departing from the scope or spirit of this invention.

What is claimed is:

1. A gas and liquid contact body for use in a gas and liquid contact apparatus in which gas and liquid flow in cross-flow relationship to one another comprising a contact body having opposed edge portions and including first and second sets of corrugated sheets having corrugations formed therein disposed in a direction transversely of the horizontal plane of the contact body, the sheets of the first set being disposed alternately with the sheets of the second set with the corrugations of the first set crossing the corrugations of the second set, said body having inlet and outlet opposed edges in the direction of gas flow and said corrugations defining passageways in said body between its opposed edges, the sheets in said first set having first and second opposed edges with said first edge being located at the inlet edge of the body and the second edge located within the body, the sheets of said second set having first and second edges with said first edge being located at the inlet edge of the body, said sheets of the second set being wider edge to edge than the width of the body to define a sheet section whose width is a difference between the width of the body and the width of the second sheet, said sheet section being folded back onto the remainder of the second sheet whereby the second edge of the second sheet is juxtaposed to the second edge of the first sheet and the undulations formed therein restrict moisture droplets from leaving said contact body through said one edge thereof.

2. A gas and liquid contact apparatus as defined in claim 1 wherein said second edges of the second sheets are spaced from the adjacent edges of their associated first sheets thereby to define liquid discharge channels in said body between said second edges of said first and second sheets.

3. A gas and liquid contact apparatus as defined in claim 2 wherein the corrugations in said first sheets are inclined downwardly in the direction of gas flow and the corrugations in the second sheet are inclined upwardly.

4. A gas and liquid contact apparatus as defined in claim 3 wherein the sheet sections of the second sheets have corrugations formed therein which are inclined oppositely of the corrugations in the remainder of the sheets.

5. A gas and liquid contact apparatus as defined in claim 1 wherein said second sheets include a drift eliminator segment adjacent said second edge thereof which includes a first section and a sheet section; the corrugations in said first section and said sheet section being mirror images of each other.

6. A gas and liquid contact body for use in a gas and liquid contact apparatus in which gas and liquid flow in cross-flow relationship to one another and having air inlet and outlet portions, said body comprising a plurality of corrugated sheets having opposed first and second edges and being facially opposed in substantially parallel relationship to one another to define a plurality of intersecting and intercommunicating passages allowing the passage of gas and liquid therethrough, said first edges of said sheets being located generally in the same plane and defining a gas inlet edge of the contact body, alternate sheets in said body being narrower from their first to their second edges than the remainder of the sheets in said body, said remainder of the sheets having an integral drift eliminator formed therein comprising a first section lying generally in the plane of the second sheet and a second section connected to and folded over said first section, the corrugations in said first and second sections being mirror images of each other.

7. A gas and liquid contact body as defined in claim 6 wherein said second edges of said alternate sheets define spaces between the wider adjacent sheets at said outlet portion, of the contact body, with said second sections of said remainder of the sheets being located in said spaces.

8. A gas and liquid contact body as defined in claim 7 wherein said second sections of said remainder of the sheets have free ends spaced from and facing the second edges of said alternate sheets thereby to define liquid discharge channels in said body.

* * * * *